United States Patent [19]

Kornbichler et al.

[11] 4,359,356

[45] Nov. 16, 1982

[54] METHOD AND APPARATUS FOR PRODUCTION OF FIBER REINFORCED WOUND BODIES

[75] Inventors: Heinz Kornbichler, Königstein; Bruno Sartor, Inden-Pier; Klaus Rode, Jülich, all of Fed. Rep. of Germany

[73] Assignee: Uranit Uran-Isotopentrennungsgesellschaft mbH, Jülich, Fed. Rep. of Germany

[21] Appl. No.: 291,063

[22] Filed: Aug. 7, 1981

[30] Foreign Application Priority Data

Aug. 7, 1980 [DE] Fed. Rep. of Germany ....... 3029890

[51] Int. Cl.³ .............................................. B65H 81/00
[52] U.S. Cl. ..................................... 156/175; 156/425
[58] Field of Search ............... 156/169, 173, 175, 174, 156/425, 426, 250, 430, 432, 428, 429, 431

[56] References Cited

U.S. PATENT DOCUMENTS

| 2,991,210 | 7/1961 | Matovich | 156/175 |
| 3,290,197 | 12/1966 | Carmody | 156/175 |
| 3,378,427 | 4/1968 | McClean | 156/425 |
| 3,697,346 | 10/1972 | Van Dorn et al. | 156/173 |
| 3,974,009 | 8/1976 | Butzow et al. | 156/173 |

FOREIGN PATENT DOCUMENTS 2216316 10/1973 Fed. Rep. of Germany .
2421619 11/1975 Fed. Rep. of Germany .
2460808 10/1977 Fed. Rep. of Germany .
2746290 4/1979 Fed. Rep. of Germany .
1282464 3/1960 France .

Primary Examiner—Michael W. Ball
Attorney, Agent, or Firm—Spencer & Kaye

[57] ABSTRACT

In the production of fiber reinforced axially symmetrical wound bodies each of predetermined length, by winding fibers or strands of fibers saturated with a hardenable plastic onto a mandrel, alternating layers of circumferential windings and layers with criss-cross windings being placed on top of one another, and, after hardening of the plastic, removing the mandrel, the winding is carried out to simultaneously produce a plurality of identical wound bodies axially juxtaposed on the mandrel by the steps of: winding at least one circumferential layer by attaching a plurality of fibers or strands corresponding to the number of bodies to be wound at axially spaced locations along the mandrel and winding all of the fibers or strands simultaneously on the mandrel with mutual axial spacings approximately corresponding to, or somewhat greater than, the length of each wound body; winding at least one criss-cross winding layer by attaching at least one fiber or strand to the mandrel and winding the fiber or strand over the combined length of the juxtaposed layers of circumferential windings along the mandrel; and dividing the completed wound layers into individual sections forming the respective wound bodies which are then removed from the mandrel.

7 Claims, 13 Drawing Figures

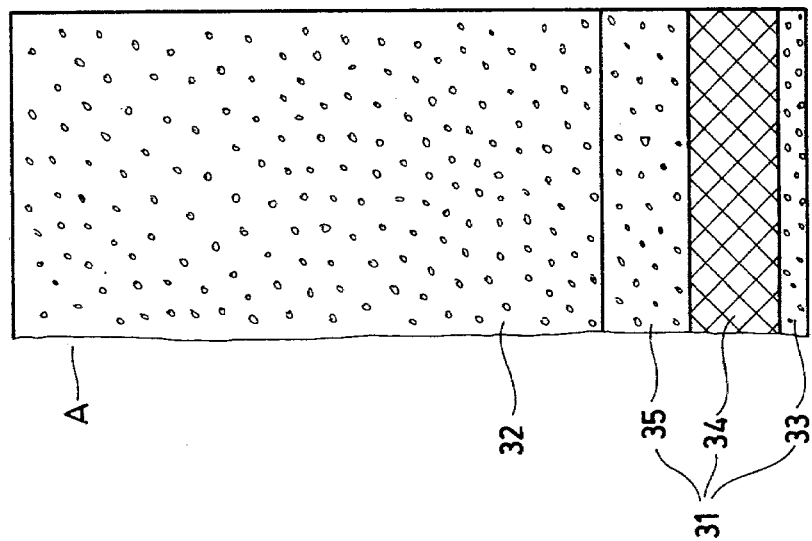
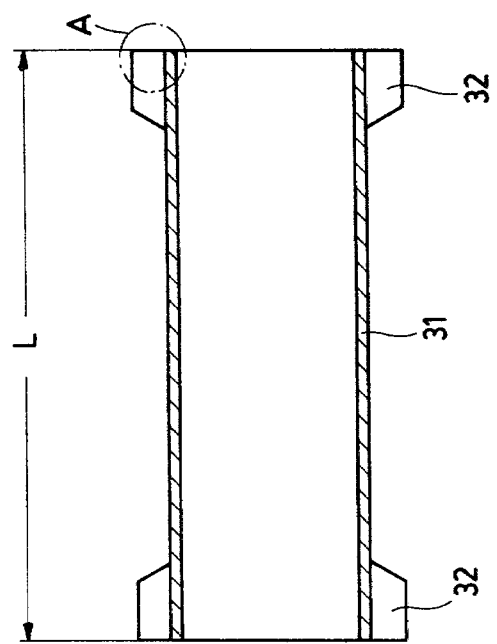
Fig. 9b
Fig. 9a

METHOD AND APPARATUS FOR PRODUCTION OF FIBER REINFORCED WOUND BODIES

BACKGROUND OF THE INVENTION

The present invention relates to a method and apparatus for producing fiber reinforced, axially symmetrical wound bodies of predetermined length.

Manufacturing methods of this type are disclosed in principle for example, in FRG Offenlegungsschrift [Laid Open Application] No. 2,216,316, Auslegeschrift [Published Application] No. 2,460,808 and Offenlegungsschrift No. 2,746,290. Wound bodies produced in this manner, particularly those made of carbon fiber reinforced laminates, are distinguished by their high strength and low specific weight. They are therefore suitable for use as rotors for gas ultracentrifuges.

French Pat. No. 1,282,464 discloses a winding system with which two layers can be wound simultaneously onto a mandrel. The mandrel is here guided along two stationary carriages; two bands are supplied by one carriage and an impregnated fiber is supplied to the mandrel by the other carriage. However, the additional application of layers with criss-cross windings in which the fibers form a relatively acute angle with the axis of the mandrel is impossible with such a system.

SUMMARY OF THE INVENTION

It is an object of the present invention to produce, in an economical manner, a series of tubular wound bodies of the same type.

The above and other objects are achieved, according to the invention by the provision of a method and apparatus for producing fiber reinforced axially symmetrical wound bodies each of predetermined length, by winding fibers or strands of fibers saturated with a hardenable plastic onto a mandrel, alternating layers of circumferential windings and layers with criss-cross windings being placed on top of one another, and, after hardening of the plastic, removing the mandrel, in which the step of winding is carried out to simultaneously produce a plurality of identical wound bodies axially adjacent one another, on the mandrel and includes: winding at least one circumferential layer by attaching a plurality of fibers or strands corresponding to the number of bodies to be wound at axially spaced locations along the mandrel and winding all of the fibers or strands simultaneously on the mandrel with mutual axial spacings approximately corresponding to, or somewhat greater than, the length of each wound body; winding at least one criss-cross winding layer by attaching at least one fiber or strand to the mandrel and winding the fiber or strand over the combined length of the axially juxtaposed layers of circumferential windings along the mandrel; and dividing the completed wound layers into individual sections forming the respective wound bodies which are then removed from the mandrel.

With the solution provided by the present invention, a plurality of wound bodies can be produced, depending on the length of the mandrel, with circumferential and criss-cross windings being produced simultaneously. The circumferential windings are applied separately for each wound body while the criss-cross windings are wound together for all wound bodies. With the use of preimpregnated fibers, the additional use of an impregnating system is no longer necessary. Moreover, the winding speed need not be adapted to the required period of dwell of the fibers in the impregnating bath if impregnation and winding are effected independently of one another with respect to time and location.

One embodiment of the invention will be explained in detail below with the aid of the drawing.

BRIEF DESCRIPTION OF THE DRAWING

FIG. 9a is a cross-sectional view of the structure of a winding body produced according to the invention.

FIG. 9b is a detail view, to an enlarged scale, of part of the body of FIG. 9a.

DESCRIPTION OF THE PREFERRED EMBODIMENTS

Figure 1:
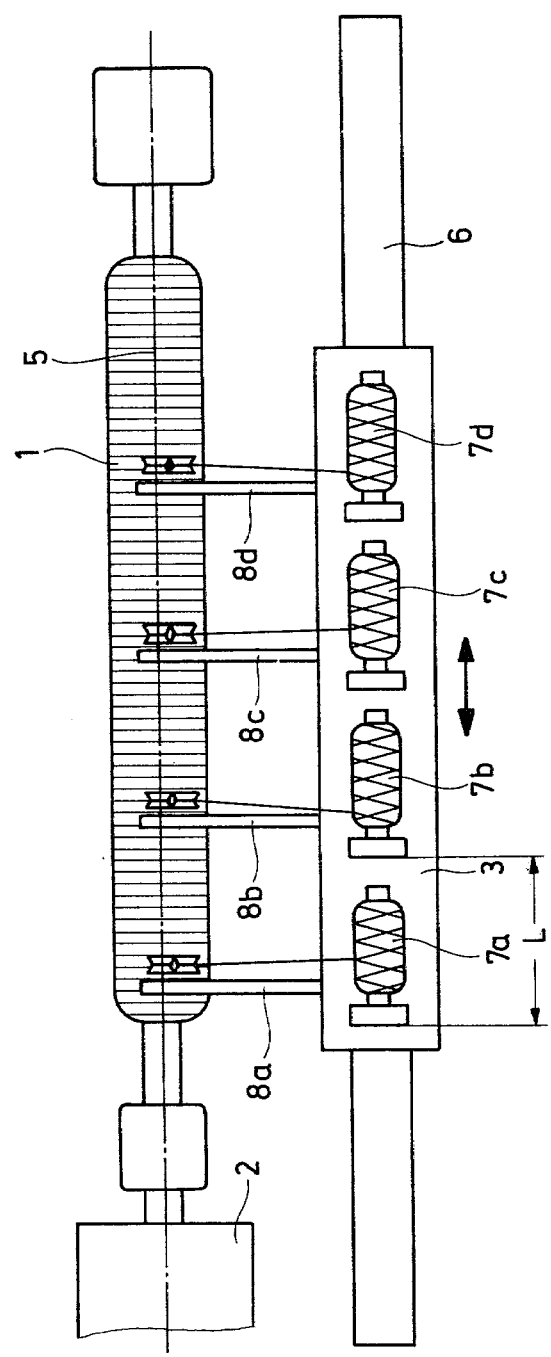
FIGS. 1 and 2 are simplified pictorial top plan views of the structure of apparatus according to the invention for making circumferential or criss-cross windings, respectively.
Figure 2:
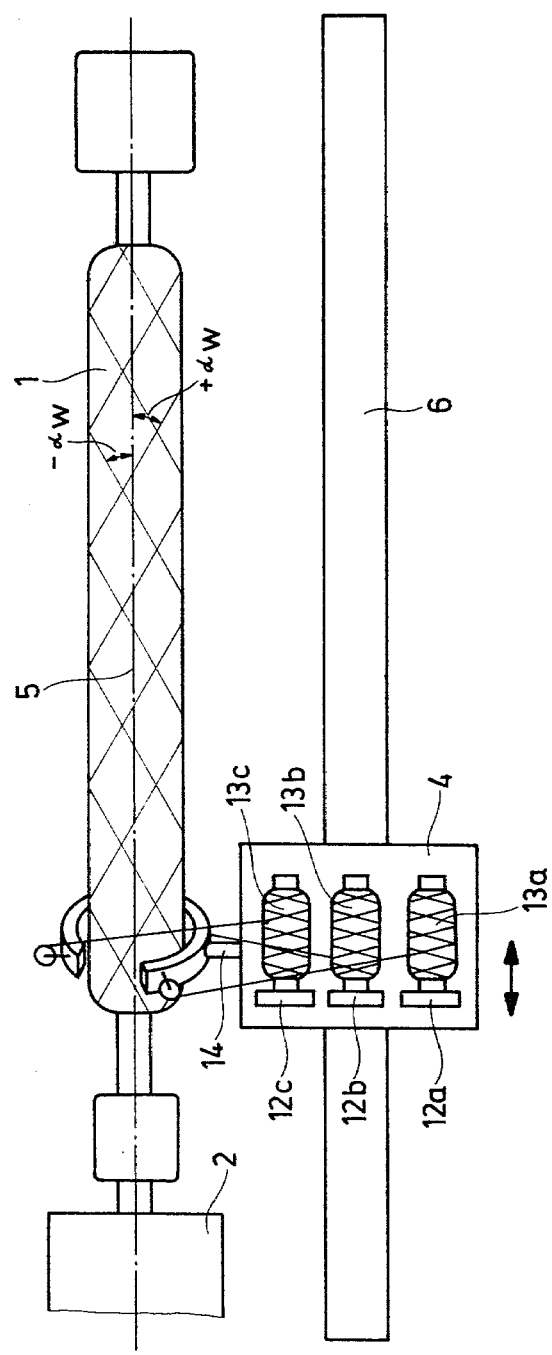

The apparatus according to FIGS. 1 and 2 essentially includes a clamped-in mandrel 1 having a drive 2, associated with a carriage 3 for the circumferential windings, shown in FIG. 1, and a carriage 4 for the criss-cross windings, shown in FIG. 2.

The carriage 3 moves parallel to the mandrel axis 5 on a carriage bed 6 and carries a plurality of bobbin mounts supporting fiber bobbins 7a, 7b, 7c and 7d and fiber supply systems 8a, 8b, 8c and 8d. The fiber supply systems are spaced apart at intervals corresponding to approximately the length L of the wound bodies to be produced (see FIG. 9a). One of the fiber supply systems 8 with its guide rollers 9 is shown in a side view in FIG. 3. Of course, a plurality of fiber strands can also be conducted simultaneously over such a system. Moreover, it is possible to distribute a plurality of such guide roller systems about the circumference of the mandrel 1 with one intake arm so that a set of fiber strands can be deposited simultaneously.

Figure 4:
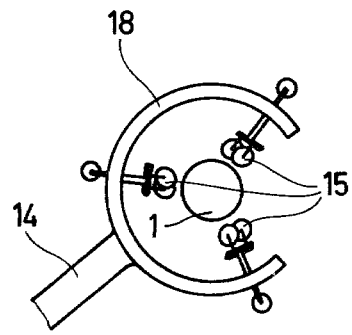

FIG. 2 shows the carriage bed 6 with a carriage 4 for producing the criss-cross windings. Three parallel bobbin mounts 12a, b, c with bobbins 13a, b, c, respectively, as well as a fiber supply device 14 are mounted on the carriage 4. The device 14 is shown in greater detail in FIG. 4 and has three roller systems 15 which are mounted on a supply frame 18 to be spaced about the circumference of the mandrel 1. The three roller systems 15 simultaneously wind three strands of fibers over the length of the mandrel as carriage 4 travels the length thereof.

Figure 5:
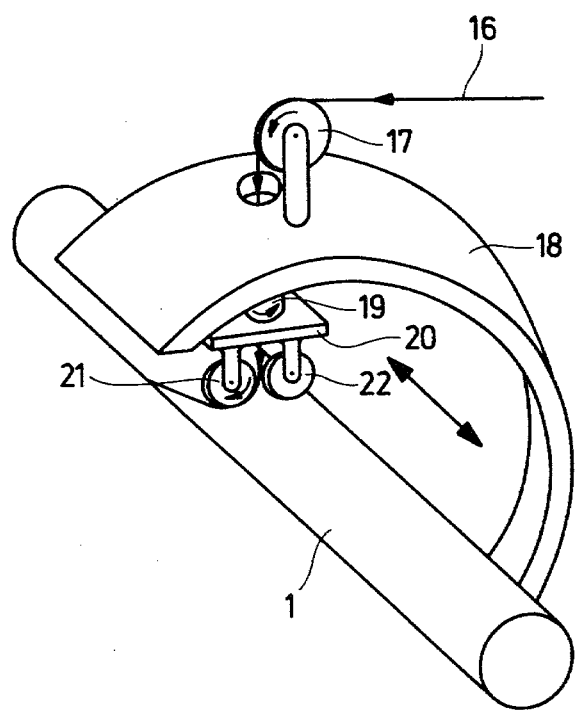
FIG. 5 is a perspective view of the laying roller system of the apparatus of FIG. 2 for forming criss-cross windings.

FIG. 5 is a perspective view showing in greater detail one of the roller systems 15. A strand of fibers 16 e.g. carbon fibers, coming from one of the bobbins 13 is deflected by a roller 17 which is fastened to the outer circumference of the supply frame 18. The frame is provided with a bore in which a hollow shaft 19 is rotatably mounted so as to be oriented toward the mandrel 1. At the end of the hollow shaft 19 there is provided a transverse bar 20 and two laying rollers 21 and 22 are rotatably supported from respective ends of bar 20. The strand of fibers 16 is threaded through the hollow shaft 19 and is laid, in the illustrated position in which the carriage moves from the left to the right and mandrel 1 rotates counterclockwise, by means of the roller 21 onto the mandrel 1. When the direction of movement of the carriage is reversed, the hollow shaft 19 is able to pivot in such a manner that the fiber strand is laid by means of roller 22.

The roller system 15 according to the invention for laying the fiber of the criss-cross winding can be used, depending on the position of the roller system 15 relative to the mandrel 1, so that one of the two rollers 21, 22 lays the fiber as the carriage moves in the forward direction and the other roller lays it as the carriage moves in the reverse direction, the fiber being changed from one roller to the other at the respective mandrel ends, or the systems for laying the fiber is used in such a way that one of the two rollers 21, 22 lays the fiber throughout the whole production of the criss-cross winding.

Figure 5A:
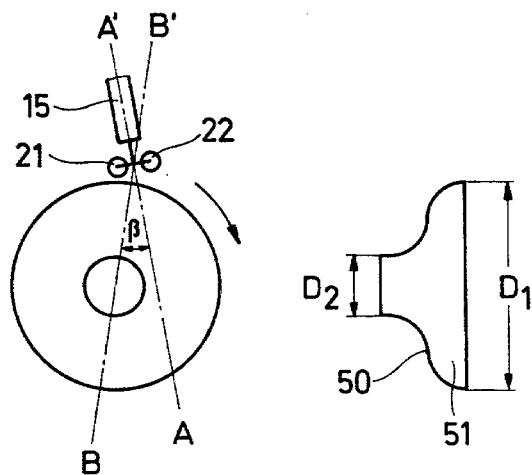
FIGS. 5a and 5b show different operative positions of the roller system.
Figure 5B:
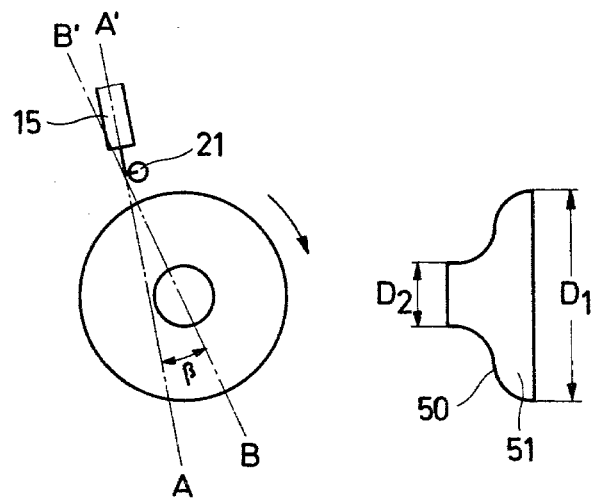

The position of the roller system relative to the mandrel 1 when the fiber is laid alternately through rollers 21 or 22, case A, and when one of the two rollers lays the whole fiber, case B, is represented in FIGS. 5a and 5b.

Case A=$D_1$ and $D_2$, respectively=larger and smaller pole cap diameters, respectively, $\beta$=angle between the longitudinal axis A=A' of the roller system 15 and the connecting line B—B' passing through the center of the mandrel and the centers of the two rollers 21 and 22. Setting condition for case A: $\beta > $ arc sin $D_2/D_1$; $\beta$ measured in the direction of rotation of the mandrel is positive. 51=pole cap, 15=roller system, 21,22=rollers.

Case B=$D_1$ and $D_2$, respectively=larger and smaller pole cap diameters, respectively, $\beta$=angle between longitudinal axis A—A' of the roller system 15 and the connecting line B—B' passing through the center of the mandrel and the centers of the two rollers 21 and 22. Setting condition for case B: $\beta$ measured in the direction of the rotation of the mandrel is zero or negative. 51=pole cap, 15=roller system, 21=roller.

In case A, the fiber is taken from one of the rollers 21, 22 by the other roller at the end of the mandrel in the following way:

After the carriage 4 and the roller system attached to it have passed the cylindrical part of the mandrel 1, the point is reached after some additional travel, which marks the point of attachment of the C-fiber at the end of the cylindrical part of the mandrel. Afterwards, the carriage 4 is slowed down to standstill within a given traveling distance and, after a given downtime, accelerated again to the constant speed it has in the cylindrical part of the mandrel. Throughout the change phase of the carriage 4, the mandrel 1 rotates at a constant speed.

During the slowing down phase and the standstill phase of the carriage 4, the point of attachment of the C-fiber moves along the circumference of the mandrel in the direction of rotation of the mandrel and is laid on the curved part 50 of the pole cap 51. As a result of the point of attachment of the fiber wandering, lateral action of the force of the C-fiber on the rollers 21, 22 first causes these to be tilted in such a way that the angle becomes slightly larger than the normal winding angle + $\alpha_w$; afterwards, the point of attachment of the fiber wanders so that the angle becomes smaller again and is almost 0 during the acceleration phase of the carriage. Shortly afterwards the roller system has moved far enough in the direction of the mandrel 1 so that the direction of the fiber is practically identical with the direction of the longitudinal axis of the roller system 15.

This is the moment at which the fiber runs freely, i.e., contacts neither of the laying rollers 21,22. In the next instant, the other roller 22 takes the fiber, laying it on the pole cap and then in the cylindrical part under the angle $-\alpha_w$. Takeover is ensured by the axis passing through the center lines of the rollers having been briefly tilted almost parallel to the axis of the mandrel by the previous movement of the fiber. According to FIG. 5b, the roller 21 is tilted continuously in one direction during the process of changing $+\alpha_w$ until it has reached the new angle $-\alpha_w$.

Figure 6A:
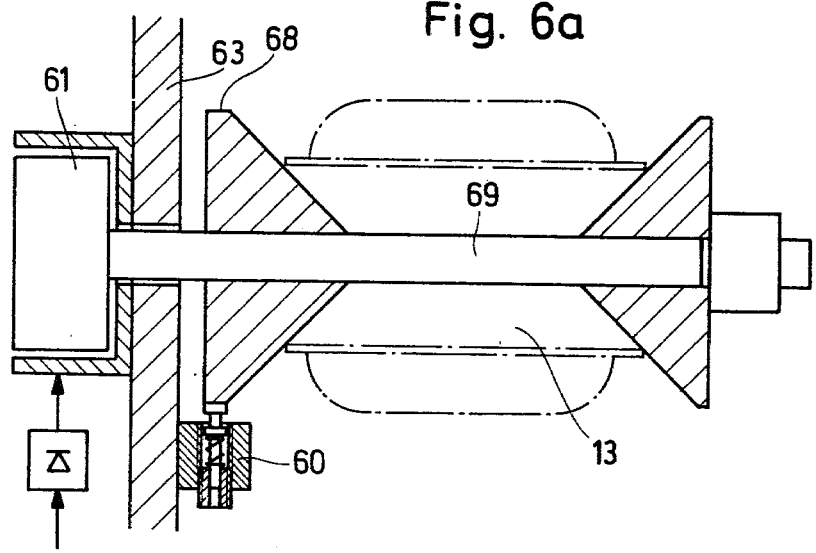
FIG. 6a is a cross-sectional view of a bobbin equipped with a braking device and usable in the apparatus of FIGS. 1 and 2.
Figure 6B:
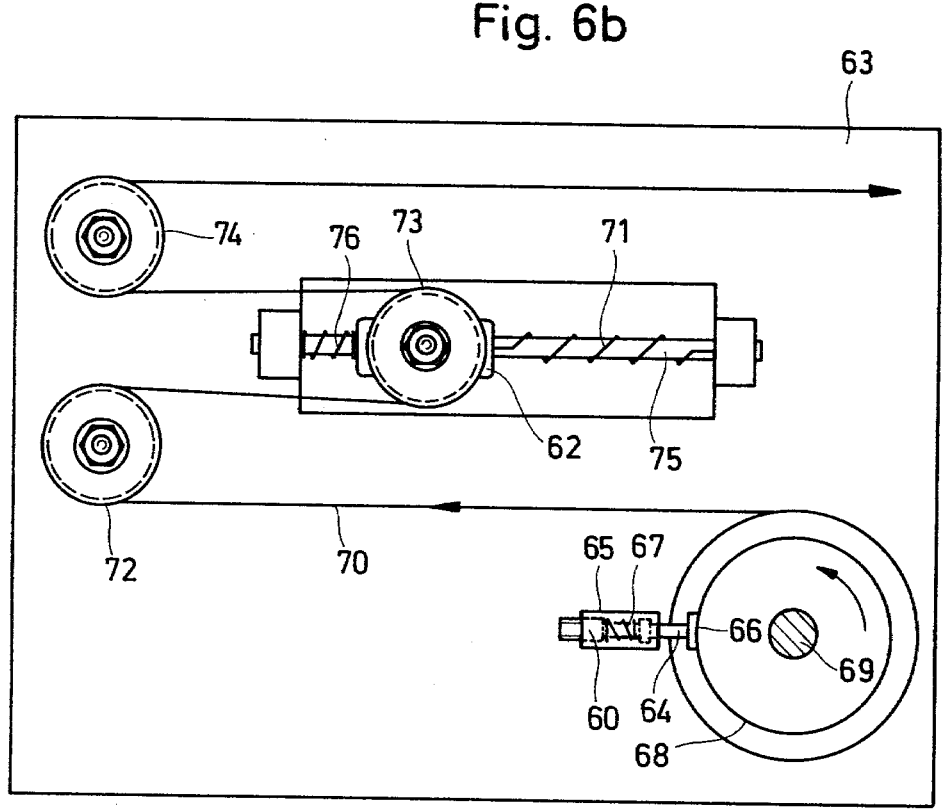
FIG. 6b is an elevational view of a resiliently suspended compensating roller for the criss-cross winding in the arrangement of FIG. 2.

FIGS. 6a and 6b show the basic structure of a bobbin 13 for the criss-cross winding in combination with a mechanical friction brake 60, an eddy current brake 61 and a tension equalizing device 62 for the fiber strand 70. The friction brake 60 is fastened to a console, or support, 63 on carriage 4 and essentially includes a brake body 64 which is axially guided in a sleeve 65 and whose free end 66 is pressed, by an adjustable spring 67, against a rotating peripheral surface 68 of the bobbin body. The eddy current brake 61 is mounted directly onto an extension of the bobbin shaft 69.

Also fastened to the carriage console 63 is the equalizing device 62, composed of a long-stroke spring 71 at whose free end there is attached a roller 73, as well as two fixed rollers 72 and 74 over which the fiber strand is placed before it reaches the laying guide, which is shown in FIG. 5. The spring 71 and the roller 72 are arranged to be displaceable along a shaft 75 in the direction of the shaft axis. A further, short-stroke, spring 76 is provided between the other end of the shaft 75 and the roller 73.

As will be further explained below, friction brake 60 applies a fixed braking force, or tension, to fiber strand 70 (16), while eddy current brake applies an additional tension which varies as a direct function of the rate of rotation of the bobbin, and hence of the fiber removal rate.

Fiber reinforced wound bodies according to the invention are produced as follows:

The fiber, e.g. a carbon filament, is initially saturated in a known manner in a synthetic resin/hardener mixture (Duroplast) to which an accelerator may be added. This mixture should have the following properties:

Processing temperature >50° C., usability at processing temperature/2 to 8 hours, usability at room termperature >2 days. The impregnation produces a resin loading which lies 10% to 30% above the resin content desired in the wound laminate.

The fibers saturated in this manner are wound onto an initially unheated bobbin with a fiber tension of $\leq 10$ N. The degree of advancement (pitch), i.e. the displacement of the fiber parallel to the bobbin axis during each complete bobbin rotation, should be more than 10 fiber widths and the ratio of wound bobbin length to degree of advancement should have a certain relationship. With this measure it is accomplished that no tangling or damage due to alternating effects of the fibers need be feared and no undue amounts of resin are pressed out of the lower layers of the bobbin.

The bobbins, which provide intermediate storage for the impregnated fibers, are kept in steady rotation until they are used again. Before their use on the winding apparatus, the bobbins are brought, by means of external heating, to a temperature 10° C. to 20° C. below the processing temperature. During winding itself, the heating of the bobbins is continued.

To produce the circumferential windings shown in FIG. 1, a number of bobbins 7 which corresponds to the number of wound bodies to be produced are simultaneously inserted into the carriage 3 and the fibers or strands of fibers, respectively, are laid onto the mandrel 1 via the guides 8 and are wound into a layer. The total axial travel of the carriage 3 is set to be somewhat longer than the length of the wound bodies to be produced.

Upon completion of a layer of circumferential windings, carriage 4, which can be moved along the entire length of the mandrel 1 at a speed which is high compared to that of the carriage 3, is used to apply a layer of criss-cross windings. For the criss-cross windings, the filament removal rate along the cylindrical portion of the mandrel 1 is constant but drops to zero at the end sections of the mandrel during reversal of the direction of travel of carriage 4 and even becomes negative to then again increase.

Figure 8:
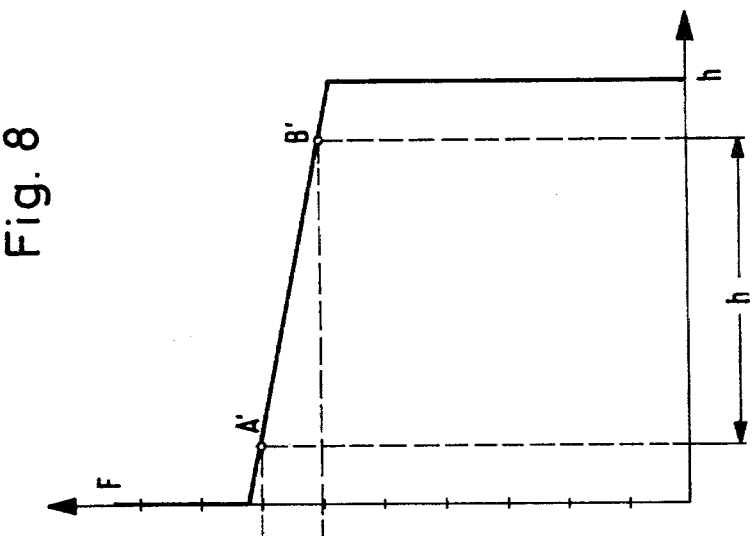
FIGS. 7 and 8 are diagrams illustrating the operation of apparatus according to the invention.
Figure 7:
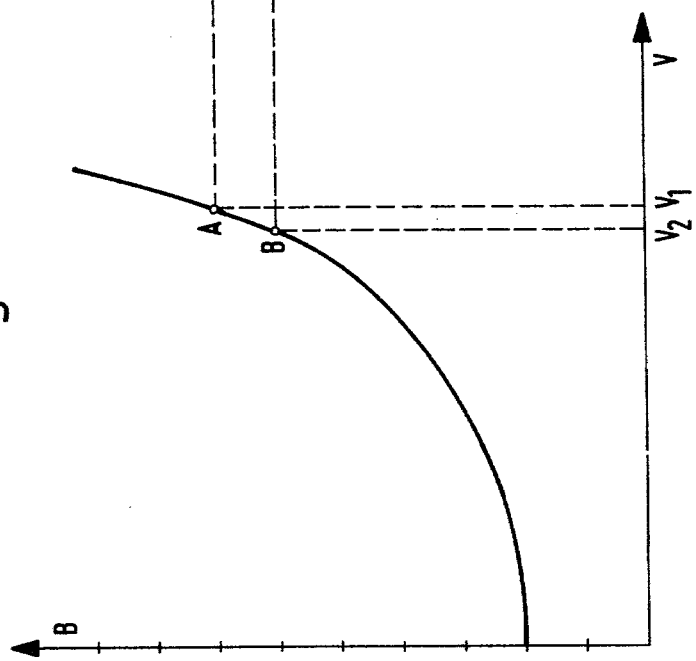

The bobbin braking device in combination with the equalizing device according to FIGS. 6a and 6b, keep the tension of the fibers and thus the removal rate from bobbin 13 approximately constant even during reversal of the direction of travel of carriage 4 at the end sections of the mandrel. This is illustrated by the diagrams of FIGS. 7 and 8. FIG. 7 shows the braking force $F_B$ on bobbin 13 as a function of the fiber removal rate, V. Because of the rate of rotation of mandrel 1 and the travel speed of carriage 4, a fiber removal rate $V_1$ results along the cylindrical portion of the mandrel, which produces a braking force A or a fiber tension A'. Tension A' is shown in FIG. 8 which depicts the fiber tension as a function of the deformation, h, of spring 71. At the points of reversal of the travel of carriage 4, the fiber tension suddenly decreases which, due to the characteristics of the eddy current brake, also results in a reduction of the braking force until the operating point B, corresponding to tension level B', has been reached. At this point, the fiber removal rate has dropped slightly to the value $V_2$; at the same time, however, the equalizing spring 71 has been able to traverse a relatively long deformation path $h_T$, and could thus store a length of fiber equal to twice this path length, or $2h_T$.

During winding of the next fiber course, the winding rate is accelerated again so that the stored length of fiber is transferred to the mandrel and the operating points A and A', respectively, are reached again. By appropriately setting the friction and eddy current brakes as well as with suitable dimensions and characteristics of the equalizing spring 71, the differences in the fiber removal rate from the bobbin and in the fiber tension can be kept within relatively narrow limits.

When the term "fiber" is used herein, this is understood to mean not only single filaments but also strands of fibers, which may comprise a plurality of filaments. In every case it is possible, with the aid of the invention, to increase the production rate by a multiple compared to the prior art, for the production of fiber reinforced wound bodies in the form of tubular sections.

One embodiment for the simultaneous production of six wound bodies will be described below.

Six axially symmetrical, identical wound bodies, each having a length of 400 mm to 600 mm and a diameter of 150 mm are to be produced simultaneously on one mandrel, each wound body including, as shown in FIGS. 9a and 9b, a cylindrical sleeve 31 provided at each end with a reinforcement 32 which is 25 mm in width, in the direction of the mandrel axis.

The wound body is to have the following layer structure:

Sleeve 31

Two layers, or courses, of circumferential windings 33, having a wall thickness of 100μ; two layers, or courses, of criss-cross windings 34, having a winding angle of ±30°, with respect to the longitudinal axis of the tube, and a wall thickness of 300μ; six layers, or courses, of circumferential windings 35 having a wall thickness of 300μ.

Reinforcement 20 layers of circumferential windings 32, wall thickness: 2000μ

Operation

1. Circumferential windings

Figure 3:
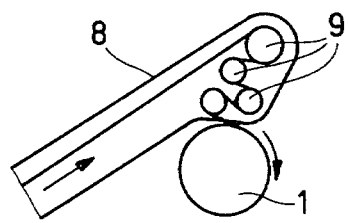
FIGS. 3 and 4 are cross-sectional detail views of devices for supplying the fibers for the circumferential or criss-cross windings, respectively.

The carriage 3 for the circumferential windings is brought into the operating position. It supports a frame with seven guides each having, at its end facing the mandrel, a roller system for laying the filaments, as shown in FIG. 3.

On the carriage, behind each filament guide there is disposed a mount which holds the bobbin with the already saturated carbon fiber material. Each mount is connected with a magnetic brake or with an eddy current brake. In addition, a friction brake is provided which is in lateral engagement with the eddy current brake.

The braking system for the circumferential winding can be identical to that of the criss-cross winding.

All guides have precisely the same spacing apart, which is kept somewhat larger than the length of a completed wound body so as to take into account the losses incurred when separating the wound bodies.

The winding takes place with a filament tension, T, of 20 N to 25 N; the filament removal rate, V, lies between 2 m/sec and 4 m/sec. In order to obtain a close arrangement on the circumference of the wound body, the filaments or threads must be spread by the pressure rollers to a width of about 3.3 mm. During the entire winding process the mandrel is at a temperature of 60° C.±5° C., effected by internal heating.

After making the circumferential windings, during which the carriage 3 moves back and forth over the length of one wound body, the pressure rollers are brought out of engagement again by hydraulic means, the carbon filaments are severed and the stand with the seven guides is retracted by about 25 cm perpendicularly to the axis of the mandrel. Then the carriage 3 is moved behind the tailstock so that during the subsequent criss-cross winding, maintenance work can be performed at the carriage 3.

2. Making the Criss-Cross Windings

The criss-cross winding carriage 4 is brought into the operating position. An arm 14 is fastened to the carriage. At the end of this arm facing the mandrel there are provided three to five laying systems 15 which are disposed in a plane perpendicular to the mandrel axis and which are arranged symmetrically around the circumference of the mandrel.

On the carriage there are a corresponding number of consoles, or supports, to which bobbin mounts 12 are fastened on the side facing the mandrel. As in the case of the circumferential winding, the bobbin mounts are connected with a friction brake and with an eddy current brake. Additionally, in the manner shown in FIG. 6b, stationary rollers are provided behind each bobbin on the side of the associated console facing away from the mandrel and therebetween an additional roller which is movable in the horizontal direction. The carbon filament or strand is guided around this additional roller before it reaches the laying roller system. The side of the additional roller facing the mandrel is firmly connected to a spring 71 (FIG. 6b) so that when the additional roller is not being pulled by the filament, it is urged toward the mandrel.

At the other side of the additional roller, there is a further, compression, spring 76 (FIG. 6b) which is in engagement with the additional roller only when the filament tension exceeds a certain value and the roller is displaced away from the mandrel. It is the function of this apparatus to store the excess filament appearing during the carriage travel direction reversal process at the ends of the mandrel and to release it again when the reversal is completed. The three to five impregnated carbon filaments provided by the bobbin via the above-described filament tension equalizing devices to the laying roller system are fastened to the mandrel precisely at the marked points and the criss-cross winding is begun with a carriage speed of 0.75 m/sec to 2 m/sec.

In order not to have any errors in the length of the fiber, the 3-5 fibers used for the criss-cross winding must be in their correct positions, which are evenly spaced over the circumference of the mandrel, already at the onset of winding. These starting positions, which must be determined experimentally, are marked, thus ensuring that the fibers are laid in the same positions at every start of the criss-cross winding.

The filament tension in the part of the mandrel spaced inwardly of the reversal points, where uniform filament feed conditions have been established, is of the order of 15 N±3 N. In order to reach the stated wall thickness of 300μ, the carriage must perform about 450 back and forth movements.

As a filament is being deposited in the cylindrical portion of the mandrel, the tension in the filament is generated by the combined braking effect of the friction brake and the eddy current brake. While the friction brake produces a constant braking force of 5 N, the braking force of the eddy current brake changes in proportion with the filament removal rate and is set so as to reach 10 N at the given carriage speed so that a total of 15 N acts on the filament.

During the reversal process at each end of the mandrel, the filament removal rate drops instantaneously at zero at the point of reversal of the criss-cross winding carriage and takes on negative values during the restarting of movement of the support in the opposite direction, i.e. the filament becomes about 200 mm longer. At the point of reversal there exists a tension force of only 5 N, produced by the friction brake. During the entire filament laying process, the above-mentioned additional, movable roller of each tension equalizing device is disposed on the cylindrical part of its associated roller guide, or shaft and when the carriage is at its point of reversal, the movable roller is at the mandrel end of its displacement path.

In order for the movable roller not to be fully retracted at the point of carriage reversal, i.e. so that no further thread is unwound, the spring force, of the spring 71 (FIG. 6b) attached to the roller must be less, when the spring is extended to its maximum length, or deflection, $d_{max}$, than the friction force, i.e.

$f \cdot d_{max} < 5$ N;

on the other hand, the maximum deflection $d_{max}$ of the spring must be greater than the displacement of the roller effected by the lengthening of the filament, i.e. $d_{max} > 100$ mm.

This is accomplished, for example, with a spring 71 whose relaxed position is 200 mm removed from the abutment near the mandrel and which has a spring constant of $f = 20$ N/m.

If the carriage again travels toward the cylindrical portion of the mandrel, i.e. the portion spaced inwardly from the mandrel ends, the filament removal rate increases continuously until it reaches its final value; at the same time the filament tension increases to 15 N and the movable roller is again pulled toward the abutment near the mandrel. There it comes into engagement with the second spring 76 which has a spring force of 500 N/m so that after compression of the spring by 1.5 cm, a counterforce of 15 N is built up.

In order to avoid changes in the filament removal rate, and thus in the filament tension, caused by the back and forth movement performed by the filament during unwinding, the distance between the stationary roller 72 of the console, over which the filament passes first, and the bobbin is set to about 1 m. This sufficiently reduces fluctuations in the rate of rotation of the bobbin, which controls the braking force of the eddy current brake.

After completion of the criss-cross windings, the carriage 4 is removed from the operating range and the carriage 3 for the circumferential windings is again brought into the operating position. The second circumferential winding 35 is made in the same manner as described under 1. above.

3. Making the Reinforcement Winding 32

After completion of the second circumferential winding 35, the carriage 3 remains in its final position. In addition to the six carbon filaments already on the mandrel, a seventh carbon filament is fastened and all seven reinforcement windings are wound simultaneously. As will be appreciated, the five intermediate reinforcement windings are each divided between two wound bodies. In contradistinction to the circumferential winding of the sleeve, the process is performed without the pressure roller and with a degree of advancement of 1.6 mm (pitch of the sleeve-winding 3.2 mm). After application of a suction fabric and an auxiliary Kevlar winding, the mandrel is brought to the hardening temperature (120° C. and 160° C. maintained for 7 hours). Then the Kevlar winding and the cloth are removed and the entire tube is separated into the corresponding wound bodies.

The suction fabric consists of a porous, teflon-coated fiberglass material; The suction fabric and the Kevlar winding on it serve to squeeze excess resin off the surface and to generate an even surface.

4. Making the Preimpregnated Carbon Filaments

In the prior art winding processes, the utilization of higher winding speeds is limited due to the fact that the impregnation of the C filaments requires a complicated roller system and must take place at a relatively slow filament advance speed. By using already impregnated carbon fibers, the relatively slow impregnation process can be decoupled in time from the actual winding process and thus the higher winding speeds of which the machine is capable can be realized. With the measures described below it is accomplished that carbon fibers which have been impregnated according to a conventional method retain a sufficient level of impregnation and processability over a period of several days.

(a) resin system

A resin system is employed whose processing temperature lies above 50° C. and whose usability time at the processing temperature is more than 5 hours.

The following system has been found to be suitable:
resin: diglycid ether (on a bisphenol A base)
hardener: an isomer Dicarbonic-acid-anhydride, e.g. Nadic Methyl Anhydride
accelerator: benzyl dimethylamine
mixing ratio, by weight: 100 parts resin; 90 parts hardener; and 1 part accelerator.

(b) winding the impregnated thread on bobbins

The resin loading of the impregnated filaments is set in such a way that the resin proportion in the filaments lies between 50 volume percent to 60 volume percent. The impregnated filament is wound onto a cylindrical bobbin (diameter 600-50) at an angle of between 75°–80° to the bobbin axis, the thread tension being less than 5 N.

By appropriate selection of the travel path traversed by the laying carriage, as determined in dependence on the winding angle and the distance between laying roller and bobbin surface, it can be accomplished that after a certain number of revolutions of the bobbin, the filaments are placed exactly on top of the previously deposited filaments, i.e. a repetitive pattern is produced which results in an open network structure. The distance between adjacent filaments is then determined by the repetition pattern and by the winding angle. If, for example, a bobbin is wound which has a diameter D=100 mm, the winding angle, α, being 80°, a filament spacing, along the bobbin axis, of:

$$A = (\pi \cdot D)/7 \cos \alpha - F = 10.115 \text{ mm}$$

results for a filament width F=1.5 mm and a repetition pattern of seven winding turns.

A repetition pattern of seven turns is set according to the relationship $$L_w = P \cdot M/(2 \cdot N)$$

where M=1, 2, 3 . . . , N=frequency of the repetition pattern, $L_w$ is the total winding length along the bobbin axis, and P is the distance between two successive filament turns measured in the direction of the longitudinal axis of the bobbin. The best results were obtained for $5 \leq N \geq 30$.

In order to be able to retain the repetition pattern, it must be considered that with an increasing number of layers the diameter of the bobbin becomes larger, which results in a shift of the pattern. This can be taken into consideration in that the distance between the laying roller and the bobbin surface is continuously increased in proportion with the number of layers already wound, e.g. by a setting motor.

If the laying roller is set back in the direction of an axis which goes through the center of the bobbin, the set back path $\Delta_x$ of the laying roller, measured from the starting position $A_0$ at the beginning of winding, after $N_L$ wound repetition patterns, is:

$$\Delta_x = d_L \cdot (1 + (2 \cdot A_0)/D_0 \cdot N_L$$

where $d_L$ is the wall thickness of one winding layer (to be determined empirically) and $D_0$ is the diameter of the bobbin.

The repetition pattern is retained with precision until about ¼ to ½ of the total quantity of fiber has been wound. Then the movement of the filament arm is stopped so that with further increasing bobbin diameter the winding pattern is shifted in such a manner that the originally formed, diamond-shaped cavities, which are filled with resin, are covered by the layers deposited later so that a sufficient quantity of resin is enclosed in the lower layers.

Preservation of the resin in the lower layers is further enhanced in that the coils are heated to about 50° C. Due to the heat shrinkage occurring after winding and during cooling of the bobbin, which can advantageously be made of aluminum, the fibers of the lower layers are additionally stress-relieved.

(c) intermediate storage of the bobbins

The bobbins are inserted into rotating receptacles which rotate at 5-10 rpm so that the uniformity of the resin distribution is assured until further processing. For increased demands with respect to air and moisture absorption of the resin, the rotating storage can also take place in a vacuum (~1 Torr).

It will be understood that the above description of the present invention is susceptible to various modifications, changes and adaptations, and the same are intended to be comprehended within the meaning and range of equivalents of the appended claims.

What is claimed is:

1. In a method for producing fiber reinforced axially symmetrical wound bodies each of predetermined length, by winding fibers or strands of fibers saturated with a hardenable plastic onto a mandrel, alternating layers of circumferential windings and layers with criss-cross windings being placed on top of one another, and, after hardening of the plastic, removing the mandrel, the improvement wherein said step of winding is carried out to simultaneously produce a plurality of identical wound bodies axially juxtaposed on the mandrel and comprises: winding at least one circumferential layer by attaching a plurality of fibers or strands corresponding to the number of bodies to be wound at axially spaced locations along the mandrel and winding all of the fibers or strands simultaneously on the mandrel with mutual axial spacings approximately corresponding to, or somewhat greater than, the length of each wound body; winding at least one criss-cross winding layer by attaching at least one fiber or strand to the mandrel and winding the fiber or strand over the combined length of the juxtaposed layers of circumferential windings along the mandrel; and dividing the completed wound layers into individual sections forming the respective wound bodies which are then removed from the mandrel.

2. Method as defined in claim 1 comprising the preliminary steps, before said step of winding fibers or strands, saturating the fibers with a hardenable plastic, immediately thereafter winding the fibers or strands onto bobbins serving as intermediate storage, maintaining the wound bobbins in constant rotation until further processing, and heating the wound bobbins before or during their use.

3. Method as defined in claim 2 wherein said step of saturating the fiber strands is carried out to establish a synthetic resin load which lies 10% to 30% above the desired synthetic resin content for the wound bodies and said step of winding onto bobbins is carried out to wind the saturated fibers or strands in such a manner that mutual spaces remain between successive turns which absorb the excess synthetic resin until further processing.

4. In apparatus including a mandrel provided with a drive and two separate carriages movable parallel to the longitudinal axis of the mandrel, for producing fiber reinforced axially symmetrical wound bodies each of predetermined length, by winding fibers or strands of fibers saturated with a hardenable plastic onto the mandrel, alternating layers of circumferential windings and layers with criss-cross windings being placed on top of one another, and, after hardening of the plastic removing the mandrel, the improvement wherein said apparatus is arranged to simultaneously produce a plurality of identical wound bodies, axially juxtaposed on said mandrel; one said carriage comprises a plurality of fiber supply devices equal in number to the number of wound bodies to be produced and said one carriage is mounted to be movable parallel to the longitudinal axis of said mandrel through a distance approximately equal to the axial length of each wound body, said one carriage serving to produce circumferential layers by attachment of a plurality of fibers or strands supplied by said supply devices and corresponding to the number of bodies to be wound at axially spaced locations along the mandrel and winding all of the fibers or strands simultaneously on said mandrel with mutual axial spacings approximately corresponding to, or somewhat greater than, the length of each wound body; and the other said carriage comprises a single fiber supply device arranged to surround said mandrel and provided with at least one supply roller system arranged to supply a fiber or strand, and said other carriage is mounted to be movable parallel to the longitudinal axis of said mandrel through a distance corresponding to the combined axial lengths of all of the wound bodies, said other carriage serving to produce criss-cross winding layers by attachment of the fiber or strand supplied by said supply roller system and winding of that fiber or strand over the axial extent of said mandrel corresponding to the combined axial lengths of all of the wound bodies.

5. An arrangement as defined in claim 4 wherein said single supply device of said other carriage is provided with a plurality of said supply roller systems distributed uniformly around the circumference of said mandrel and each arranged to supply a respective fiber or strand for producing the criss-cross winding layers by attachment of all of the fibers or strands supplied by said plurality of systems and simultaneously winding all of those fibers or strands on said mandrel.

6. An arrangement as defined in claim 4 wherein said single fiber supply device comprises a ring-shaped frame member provided with a through bore, and a hollow shaft rotatably mounted in said bore and positioned to extend toward said mandrel; and said roller system comprises a guide roller mounted on the side of said frame facing away from said mandrel for guiding the associated fiber or strand into the interior of said shaft, and two laying rollers fastened to the end of said shaft directed toward said mandrel, said two laying rollers being arranged to alternatingly guide the associated fiber strand from the interior of said shaft onto said mandrel.

7. An arrangement as defined in claim 4 wherein said other carriage comprises: a bobbin mount for holding a bobbin carrying the associated fiber or strand; means for applying a speed-independent braking force to said mount; means for applying a speed-dependent braking force to said mount; and means for equalizing the tensile force imposed on the associated fiber or strand as it is fed from the bobbin to said mandrel, and wherein said tensile force equalizing device comprises: a plurality of guide rollers around which the fiber or strand passes during such feeding; a shaft fixed to said other carriage and on which one said guide roller is movably mounted; and a long stroke spring and a short stroke spring each mounted between said carriage and a respective opposite side of said one guide roller.

* * * * *